United States Patent [19]

Chromecek et al.

[11] Patent Number: 5,135,660
[45] Date of Patent: Aug. 4, 1992

[54] METHOD OF RECOVERING OIL FROM THE SURFACE OF WATER

[75] Inventors: Richard C. Chromecek, Litchfield, Conn.; William L. Klein, Sparta, N.J.

[73] Assignee: Dow Corning Corporation, Midland, Mich.

[21] Appl. No.: 637,730

[22] Filed: Jan. 7, 1991

[51] Int. Cl.⁵ .......................................... E02B 15/04
[52] U.S. Cl. .................................. 210/671; 210/692; 210/693; 210/924
[58] Field of Search ............... 210/693, 671, 680, 692, 210/924; 134/7

[56] References Cited

U.S. PATENT DOCUMENTS

| | | | |
|---|---|---|---|
| 3,518,183 | 6/1970 | Evans | 210/693 |
| 3,674,722 | 7/1972 | Rainer et al. | 264/48 |
| 3,716,483 | 2/1973 | Renner | 210/693 |
| 3,770,627 | 11/1973 | Alquist et al. | 210/693 |
| 3,819,514 | 6/1974 | Clampitt et al. | 210/671 |
| 3,915,855 | 10/1975 | Teng | 210/671 |
| 3,966,597 | 6/1976 | Omori et al. | 210/693 |
| 4,064,043 | 12/1977 | Kollman | 210/690 |
| 4,234,420 | 11/1980 | Turbeville | 210/924 |
| 4,343,680 | 8/1982 | Field et al. | 210/693 |
| 4,401,571 | 8/1983 | Ney | 210/924 |
| 4,519,918 | 5/1985 | Ericsson et al. | 210/693 |
| 4,690,825 | 9/1987 | Won | 424/501 |
| 4,719,040 | 1/1988 | Traas | 512/4 |
| 4,724,240 | 2/1988 | Abrutyn | 514/847 |
| 4,764,382 | 8/1988 | Barchas | 424/61 |
| 4,776,358 | 10/1988 | Korsk | 132/321 |
| 4,806,360 | 2/1989 | Leong | 424/487 |
| 4,813,976 | 3/1989 | Barchas | 51/293 |
| 4,828,542 | 5/1989 | Hermann | 604/3 |
| 4,855,127 | 8/1989 | Abrutyn | 424/411 |
| 4,855,144 | 8/1989 | Leong | 424/487 |
| 4,870,145 | 9/1989 | Chromecek | 526/217 |
| 4,873,091 | 10/1989 | Jankower | 424/489 |
| 4,880,617 | 11/1989 | Chromecek | 424/501 |
| 4,881,490 | 11/1989 | Ducharme | 119/1 |
| 4,883,021 | 11/1989 | Ducharme | 119/1 |
| 4,898,913 | 2/1990 | Ziemellis | 525/301 |
| 4,904,524 | 2/1990 | Yoh | 423/311 |
| 4,923,894 | 5/1990 | Kanda | 514/493 |
| 4,933,372 | 6/1990 | Feibush | 521/91 |
| 4,941,978 | 7/1990 | Gabrick | 210/924 |
| 4,948,818 | 8/1990 | Carmody | 521/149 |
| 4,958,999 | 9/1990 | Liscomb | 425/110 |
| 4,961,532 | 10/1990 | Tangney | 239/60 |
| 4,962,133 | 10/1990 | Chromecek | 521/56 |
| 4,962,170 | 10/1990 | Chromecek | 526/212 |
| 5,017,238 | 5/1991 | Chromecek et al. | 134/7 |

FOREIGN PATENT DOCUMENTS

| | | |
|---|---|---|
| 1168157 | 5/1984 | Canada . |
| 61701 | 10/1982 | European Pat. Off. . |
| 306236 | 3/1989 | European Pat. Off. . |
| 369741 | 5/1990 | European Pat. Off. . |
| 8702013 | 2/1988 | PCT Int'l Appl. . |
| 8910132 | 11/1989 | PCT Int'l Appl. . |

*Primary Examiner*—Stanley S. Silverman
*Assistant Examiner*—Cynthia L. Nessler
*Attorney, Agent, or Firm*—Jim L. DeCesare

[57] ABSTRACT

A method of recovering oil floating on a water surface which has been contaminated with the oil by distributing upon the contaminated surface discrete particles of a hydrophobic macroporous highly crosslinked polymer. The particles are allowed to adsorb and to become laden with the oil. The oil laden particles are recovered from the water surface, and the oil from the oil laden particles is removed by applying compressive forces to the oil laden particles. Particles which are substantially free of the oil are recirculated and re-distributed upon the contaminated surface, and this sequence of steps is repeated until substantially all of the oil has been recovered.

1 Claim, 3 Drawing Sheets

10000 X

1500 X

10000 X

2000 X

1500 X

METHOD OF RECOVERING OIL FROM THE SURFACE OF WATER

BACKGROUND OF THE INVENTION

This invention relates to an oil recovery method in which oil contaminating surface waters is recovered by contacting the oil with particles of a hydrophobic macroporous highly cross-linked polymer. More particularly, the invention includes the use of small porous polymethacrylate particles as an oil adsorbent.

The concept of producing spheres and beads of a macroporous polymer is old in the art, as well as the use of such macroporous structures for the entrapment and subsequent delivery of certain active ingredients. One example of this concept may be found in U.S. Pat. No. 4,690,825 issued Sep. 1, 1987 in which a suspension polymerization process is employed to produce beads from a monomer system including styrene and divinylbenzene. Mineral oil is entrapped "in situ" and the beads are said to possess utility in various cosmetic applications. In U.S. Pat. No. 4,719,040 issued Jan. 12, 1988, a macroporous polymer laden with perfume is incorporated into an air freshener gel. U.S. Pat. No. 4,724,240 issued Feb. 9, 1988; European Patent No. 61,701 granted Jul. 16, 1986; and Canadian Patent No. 1,168,157 issued May 29, 1984, each relate to "in situ" entrapped emollients and moisturizers carried within macroporous beads. Various cosmetic and toiletry applications of these products are disclosed.

A macroporous polymer entrapping an emollient is taught in U.S. Pat. No. 4,764,362 issued Aug. 16, 1988, and in U.S. Pat. No. 4,813,976 issued Mar. 21, 1989, in which the polymer is incorporated into a nail conditioning emery board. During filing of the nails, the emollient is released in order to condition and lubricate the nails. A similar concept is taught in U.S. Pat. No. 4,776,358 issued Oct. 11, 1988 in which a dental floss includes flavor oils entrapped in certain "microsponges". Suspension polymerized macroporous polymer beads are taught in U.S. Pat. No. 4,806,360 issued Feb. 21, 1989, and in U.S. Pat. No. 4,855,144 issued Aug. 8, 1989, wherein melanin pigment is incorporated into the macroporous structure and applied to the skin and said to function as a sunscreen. Similar bead structures are also taught in European Patent Application Publication No. 306 236A2 published Mar. 3, 1989, and in Patent Cooperation Treaty International Publication No. WO 88/01164 published Feb. 25, 1988.

A reticulated polyurethane foam is disclosed in U.S. Pat. No. 4,828,542 issued May 9, 1989 having macroporous polymer particles bonded to the foam. The particles entrap a liquid soap and the foam functions as a cleaning pad. In U.S. Pat. No. 4,855,127 issued Aug. 8, 1989, and U.S. Pat. No. 4,880,617 issued Nov. 14, 1989, hydrophobic polymeric porous beads are used as a free-flowing solid carrier for various pheromones, pesticides, fragrances, and chemicals entrapped therein. Hydrophilic beads are formed in U.S. Pat. No. 4,870,145 issued Sep. 26, 1989 and upon removal of the solvent used to form the voids, the beads possess various utilities including incorporation into contact lens cleaners, facial scrubs, and tile cleaners. In U.S. Pat. No. 4,873,091 issued Oct. 10, 1989 resilient microbeads are formed by suspension polymerizing curable elastomers such as isoprene rubbers to produce porous rubber beads. The porous rubber beads are employed in topical applications. In the Patent Cooperation Treaty International Publication No. WO89/10132 published Nov. 2, 1989 porous particles are disclosed as an ingredient in personal care emulsions. A pet litter is described in U.S. Pat. No. 4,881,490 issued Nov. 21, 1989, and U.S. Pat. No. 4,883,021 issued Nov. 28, 1989, wherein a macromolecular polymer entrapping a fragrance is incorporated in an animal litter to slowly release fragrance for combating odors.

In U.S. Pat. No. 4,898,913 issued Feb. 6, 1990 macroporous hydrophobic powder materials are rendered hydrophilic by treatment of the surface of the powder. In one embodiment of the '913 patent, the surface is saponified whereas in another embodiment an acrylate monomer is polymerized on the surface. A wet wipe useful in personal care applications is disclosed in U.S. Pat. No. 4,904,524 issued Feb. 27, 1990 wherein macroporous polymeric beads containing a silicone skin conditioner are incorporated into the surface of a paper sheet. Polymeric microparticles loaded with a fungicide are taught in U.S. Pat. No. 4,923,894 issued May 8, 1990. In U.S. Pat. No. 4,933,372 issued Jun. 12, 1990 there is described rigid resin particles formed by polymerizing monounsaturated and polyunsaturated monomers within the pores of inorganic template particles such as silica gel, silica, alumina, zirconia, and metal oxides. The template particles are dissolved leaving porous adsorptive particles which mirror the template particles in size, surface area, and porosity. Macroporous particles capable of adsorbing hydrophilic as well as lipophilic fluids are taught in U.S. Pat. No. 4,948,818 issued Aug. 14, 1990.

In accordance with the present invention however a new and novel use of an otherwise old material has been discovered wherein provision is made for oil adsorption from surface waters by contact with hydrophobic macroporous polymer particles which are free of any "in situ" entrapped active ingredient. The empty macroporous particles function as a recycleable adsorbent and because of their inert nature enable the recovered oil to be reused.

Thus, in the wake of recent oil spill events involving oil tankers and other oil transporting vessels, there is a need for new and effective methods for solving such environmental problems.

SUMMARY OF THE INVENTION

This invention relates to a method of recovering oil floating on a water surface which has been contaminated with the oil by distributing upon the contaminated surface discrete particles of a hydrophobic macroporous highly crosslinked polymer. The particles are allowed to adsorb and to become laden with the oil. The oil laden particles are recovered from the water surface, and the oil from the oil laden particles is removed by applying compressive forces to the oil laden particles. Particles which are substantially free of the oil are recirculated and re-distributed upon the contaminated surface, and this sequence of steps is repeated until substantially all of the oil has been recovered. The oil laden particles may be squeezed under compressive forces in order to remove the oil from the particles, and the squeezed substantially oil free particles are sifted prior to recirculation and redistribution in order to eliminate excessive agglomeration and aggregation of the particles due to application of the compressive squeezing forces.

These and other objects, features, and advantages, of the present invention will become apparent when considered in light of the following detailed description including the accompanying drawings.

IN THE DRAWINGS

Figure 1:
FIG. 1 is a photomicrograph of the individual components of the complex structure of the macroporous powder produced by a precipitation polymerization process in accordance with Example I, and wherein there is illustrated the unit particles, agglomerates, and aggregates.

Each figure in the drawing indicates in the upper left hand corner the magnification employed in producing the photomicrograph.

DETAILED DESCRIPTION OF THE INVENTION

Figure 2:
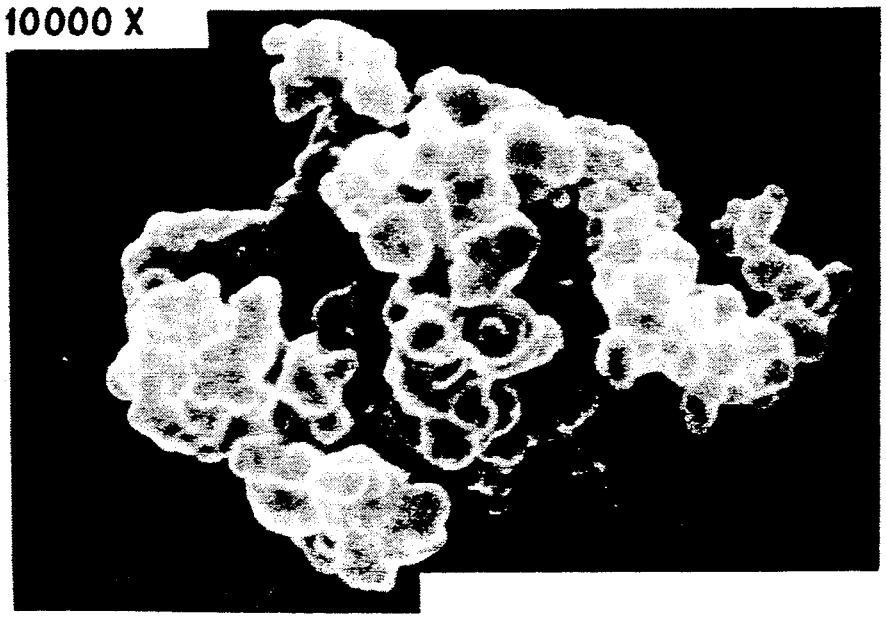
FIG. 2 is a photomicrograph of a single agglomerate of FIG. 1 but wherein the agglomerate is shown on a much larger scale.
Figure 3:
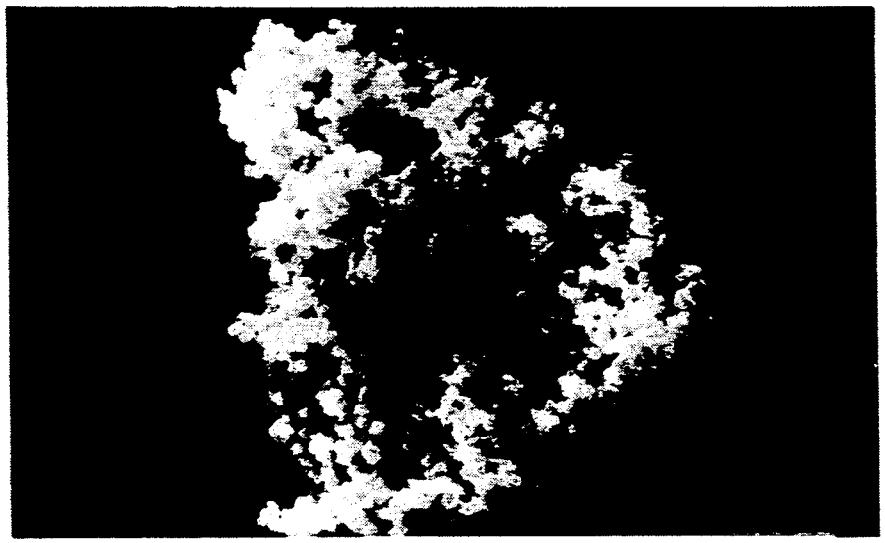
FIG. 3 is a photomicrograph of a single aggregate of FIG. 1 but wherein the aggregate is shown on a larger scale.

As should be apparent from a consideration of FIGS. 1-3, the polymeric material of the present invention is macroporous because of its complex arrangement of unit particles, agglomerates, and aggregates. As a result of this complex structure, the material possesses an inordinate amount of interstitial space and is a labyrinth of voids. Volatile ingredients entrapped within the void volume of the material are released by wicking to the surface and evaporate at a rate dependent upon such factors as temperature, vapor pressure, and surface area. Nonvolatile ingredients migrate to the surface by means of capillary action and are released on contact with another surface. Mechanical disruption may also be used to release the entrapped ingredient. While the material is shear sensitive, it is not compression sensitive. The matrial is capable of wicking ingredients from another surface in the manner of a sponge. The material does not shrink or expand even though it is capable of adsorbing several times its own weight of an active ingredient. Since the process involved is adsorption in contrast to absorption, the properties of both the material and the active ingredient are not altered. Active ingredients are entrapped within the material in contrast to being encapsulated. Encapsulation connotes a complete enclosing of one material within another such as a shell formed around a core of liquid. Encapsulated ingredients are released by mechanical disruption of the shell or dissolution of the shell, and once the shell is disrupted the entire contents of the shell are extracted. With entrapment, however, the release of the entrapped ingredient is controlled or sustained by wicking, evaporation, and capillary action. In addition, the active ingredient is permitted a relatively unobstructed ingress and egress into and out of the labyrinth in entrapment type systems.

The hydrophobic macroporous material of the present invention can be generically described as a crosslinked polymer in particulate form capable of entrapping solids and liquids. The particles are free flowing and discrete particulates even when loaded with an active ingredient. One polymer representative of the materials in accordance with the present invention has the formula:

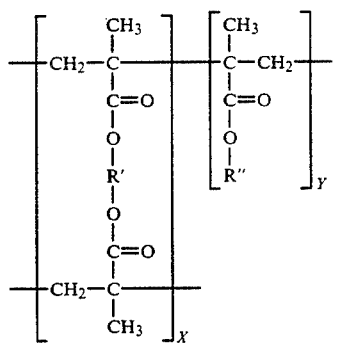

wherein the radio of x to y is 80:20, R' is —$CH_2CH_2$—, and R" is —$(CH_2)_{11}CH_3$.

This polymeric material is highly crosslinked and is a polymethacrylate. The material is manufactured by the Dow Corning Corporation, Midland, Mich., U.S.A., and sold under the trademark POLYTRAP. It is a low density, highly porous, free-flowing white particulate, and the particles are capable of adsorbing high levels of lipophilic liquids and some hydrophilic liquids while at the same time maintaining a free-flowing particulate character. The polymer can be formed by polymerizing a single polyunsaturated monomer such as ethylene glycol dimethacrylate or tetraethylene glycol dimethacrylate. The polymer may also be formed by polymerizing two monomers including a polyunsaturated monomer and a monounsaturated monomer such as lauryl methacrylate or 2-ethylhexyl methacrylate.

The polymer particles can be in the form of a bead having an average diameter of about ten microns to about one hundred-fifty microns. Alternatively, the polymer particles can be in the form of a powder and this powder is best defined as being a combined system of particles. The system of powder particles includes unit particles of less than about one micron in average diameter, agglomerates of several fused unit particles of sizes in the range of about twenty to eighty microns in average diameter, and aggregates of clusters of several fused agglomerates of sizes in the range of about two-hundred to about twelve-hundred microns in average diameter. Whether the polymer is in the form of a spherical macroporous bead or in the form of the complex macroporous powder, the structure in accordance with this invention must be free of any "in situ" entrapped active ingredient, although in other applications particulates containing entrapped active materials are employed.

A precipitation polymerization process is one method for producing the macroporous cross-linked polymer. In the process, there is polymerized one monounsaturated monomer and one polyunsaturated monomer in the presence of an excess of a volatile organic liquid which is a solvent for the monomers but not for the polymer. Polymerization of the monomers is initiated by means of a free radical generating catalytic compound which precipitates a polymer in the solvent in the form of a powder structure. A dry powder is formed by removing the volatile solvent from the precipitated polymeric powder leaving a structured submicron sized adsorbent. The most preferred solvent is isopropyl alcohol although other solvents such as ethanol, toluene, heptane, xylene, hexane, ethyl alcohol, and cyclohexane may also be employed. The monounsaturated monomer and the polyunsaturated monomer can be present in several mole ratios among which are 20:80, 30:70, 40:60, or 50:50. The process includes the step of stirring the monomers, solvent, and the free radical generating catalytic compound during polymerization. The powder is dried by filtering excess solvent from the precipitated powder and the filtered powder is vacuum dried. The empty powder may be used in its dry form or it can be formulated by "post adsorbing" the empty powder with various functional materials. In the present invention, the empty powder is in the form employed in the oil recovery method described herein.

Where applicable, adsorption of active ingredients can be accomplished using a stainless steel mixing bowl and a spoon. The active ingredient is added to the empty dry powder and the spoon is used to gently fold the active into the powder. Low viscosity fluids may be adsorbed by addition of the fluids to a sealable vessel containing the powder and tumbling the materials until the desired consistency is achieved. More elaborate blending equipment such as ribbon or twin cone blenders can also be employed.

The following example illustrates one method for making an adsorbent powder of the type illustrated in FIGS. 1-3.

EXAMPLE I

A hydrophobic porous polymer was produced in a five hundred milliliter reactor equipped with a paddle type stirrer by mixing 13.63 grams of ethylene glycol dimethacrylate monomer which is equivalent to eighty mole percent, and 4.37 grams of lauryl methacrylate monomer which is equivalent to twenty mole percent. Isopropyl alcohol was added to the reactor as the volatile solvent in the amount of 282 grams. The monomers were soluble in the solvent but not the precipitated polymer. The process can also be conducted using one polyunsaturated monomer instead of two monomers. The mixture including the monomers, solvent, and 0.36 grams of the catalytic initiator benzoyl peroxide was purged with nitrogen. The system was heated with a water bath to sixty degrees Centigrade until polymerization was initiated and the temperature was increased to 70-75 degrees for six hours to complete polymerization. During this time the polymer precipitated from the solution. The polymerization produced unit particles of a diameter less than about one micron. Some of the unit particles adhered and fused together forming agglomerates about twenty to eighty microns in diameter. Some of the agglomerates adhered and fused together forming aggregates of loosely held assemblies of agglomerates about two-hundred to twelve-hundred microns in diameter. The mixture was filtered to remove excess solvent and a wet powder cake was tray dried in a vacuum oven. A dry hydrophobic polymeric powder consisting of unit particles, agglomerates, and aggregates was isolated.

The method of Example I is a precipitation polymerization technique. In accordance with this technique, monomers are dissolved in a compatible volatile solvent in which both monomers solubilize. Polymer in the form of a powder is precipitated and the polymer is insoluble in the solvent. No surfactant or dispersing aid is required. The materials produced are randomly shaped particles and not spheres or beads. The randomly shaped powder particulates include unit particles, agglomerates, and aggregates. The volatile solvent is removed leaving an empty dry powder. The empty dry powder is suitable for use in that active-free condition in some applications or it may be "post adsorbed" with a variety of functional active ingredients for other applications.

Some unique features of the powder of Example I and FIGS. 1-3 is its ability to adsorb liquids and yet remain free flowing. The material provides a regulated release of ingredients entrapped therein and has the capability of functioning as a carrier. The powders disappear when rubbed upon a surface. This phenomenon is due to the fact that large aggregates of the material scatter light rendering the appearance of a white particulate, but when rubbed these shear sensitive large aggregates decrease in size approaching the range of visible light and hence seem to disappear. The materials possess utility in many diverse areas such as cosmetics and toiletries, household and industrial products, pesticide and pheromone carriers, and pharmaceuticals applications for example.

The following example illustrates another precipitation polymerization process but in which an organic ester is entrapped "in situ" in the polymer. Thus, no volatile solvent is employed in Example II. The ester remains entrapped in accordance with this example.

EXAMPLE II

Seven grams of the ester 2-ethylhexyl oxystearate was mixed with 1.5 grams of ethylene glycol dimethacrylate and 1.5 grams of lauryl methacrylate in a glass test tube. The solution was deaerated for five minutes and 0.1 milliliters of t-butyl peroctoate was added and mixed while heating to eighty degrees Centigrade in an oil bath. After twenty minutes the contents of the glass test tube solidified and the mixture was maintained at the same temperature for an additional hour to assure full polymerization. A heterogeneous white polymer resulted containing the entrapped ester.

As noted, the powder product of Example I differs from the powder product of Example II in that a volatile solvent is used in Example I and the solvent is removed resulting in a dry empty powder free of active ingredients, whereas in Example II a non-volatile functional material is polymerized "in situ" and the active ingredient remains entrapped in the powder product.

In contrast to Examples I and II, suspension polymerization is a process which is carried out in water. The monomers, active ingredient, and the catalyst, are combined and form beads or droplets in the water and polymerization occurs within each bead. A surfactant or stabilizer such as polyvinyl pyrrolidone is required to prevent each individually formed bead and droplet from coalescing. The resulting beads with an active material entrapped therein include a substantially spherical outer crust or shell within which is an interior of macroporous structure. The bead is about ten microns in average diameter to about one hundred-fifty microns depending upon the rate of agitation employed during the process.

Example III illustrates a process for the production of beads by a suspension polymerization process in which an organic ester is entrapped "in situ" within the beads.

EXAMPLE III

Figure 4:
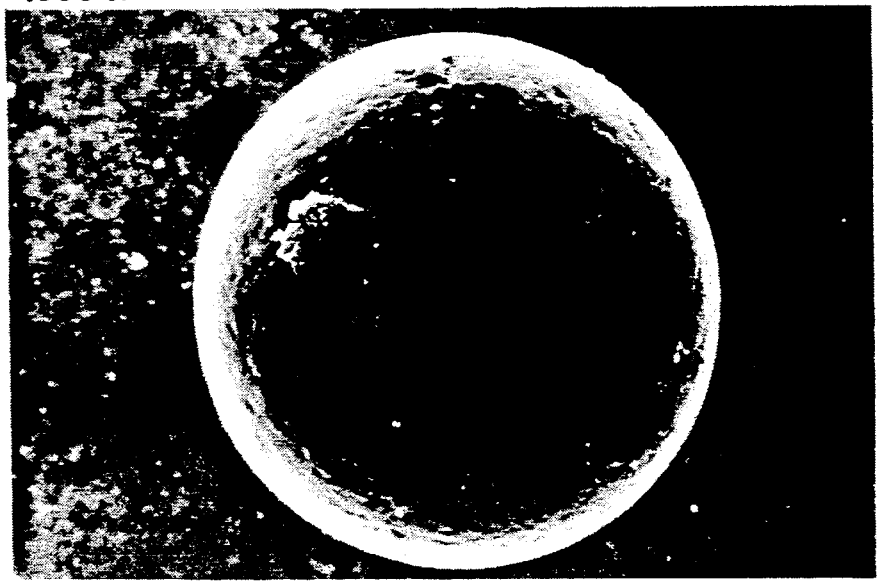
FIG. 4 is a photomicrograph of a single polymer bead produced by a suspension polymerization process carried out in accordance with Example III.
Figure 5:
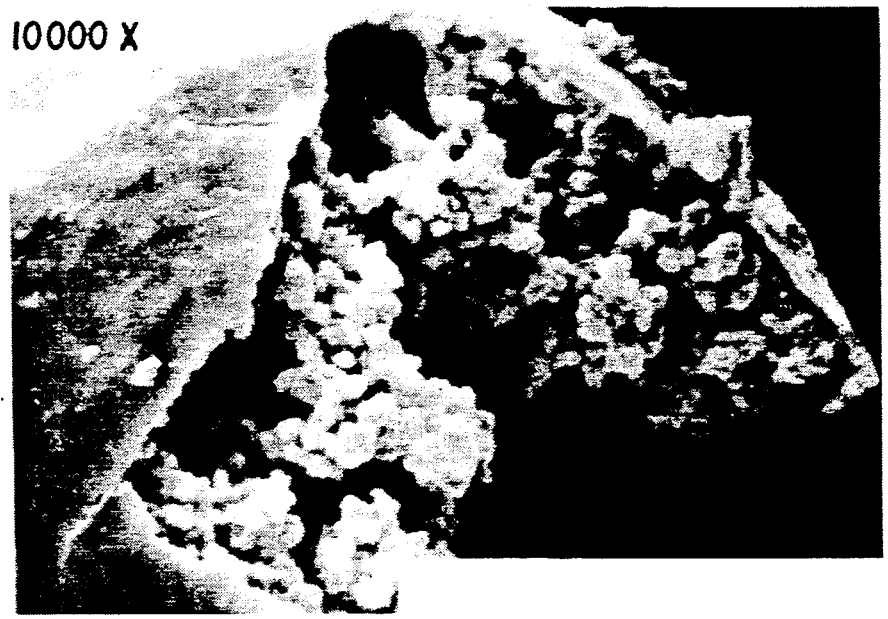
FIG. 5 is a photomicrograph of the single bead of FIG. 4 but wherein the bead is shown on a larger scale and in which the bead has a portion of the outer surface removed revealing the interior macroporous structure of the bead.

In a two liter three necked flask equipped with a stirrer, thermometer, and a nitrogen purge, 1.2 grams of polyvinyl pyrrolidone was dissolved in 1500 milliliters of water. A solution of 335 grams of the ester 2-ethylhexyl oxystearate, 132 grams of ethylene glycol dimethacrylate, thirty-three grams of 2-ethylhexyl methacrylate, and five milliliters of t-butyl peroctoate was bubbled with nitrogen for five minutes. This mixture was slowly added to the stirred aqueous solution of polyvinyl pyrrolidone at twenty-two degrees Centigrade under nitrogen purge. The temperature was raised to eighty degrees with constant agitation and held until polymerization initiated in about fifteen minutes. The temperature was maintained at eighty degrees for an additional two hours to complete the reaction. White beads were collected by filtering off the supernatant liquid and dried to remove any excess water. The beads weighed 450 grams for a yield of ninety percent and were 0.25 to 0.5 millimeters in diameter. Beads of this type are shown in the drawings in FIGS. 4 and 5. Other protective colloids such as starch, polyvinyl alcohol, carboxymethyl cellulose, methyl cellulose, or inorganic divalent alkali metal hydroxides such as MgOH may be used in place of the polyvintyl pyrrolidone suspending medium in this example.

In Example III, macroporous polymers submicrons in size are produced and polymerization is conducted in the presence of an active ingredient which does not dissolve or swell the resulting polymer. The monomers and the active ingredient are mutually soluble but insoluble in the aqueous suspending medium in which droplets are formed. Polymerization occurs within suspended droplets and beads or spheres are produced. The active ingredient which is polymerized "in situ" is entrapped and contained within the beads but the active ingredient is capable of being released. A volatile solvent can be substituted for the active ingredient and removed leaving behind an empty porous polymer bead product free of "in situ" entrapped active materials. Examples of polyunsaturated monomers suitable for use in accordance with the present invention are ethylene glycol dimethacrylate, triethylene glycol dimethacrylate, tetraethylene glycol dimethacrylate, trimethylolpropane ethoxylated triacrylate, ditrimethylolpropane dimethacrylate; propylene, dipropylene and higher propylene glycols; 1,3 butylene glycol dimethacrylate; 1,4 butanediol dimethacrylate; 1,6 hexanediol dimethacrylate, neopentyl glycol dimethacrylate, pentaerythritol dimethacrylate, dipentaerythritol dimethacrylate, bisphenol A dimethacrylate, divinyl and trivinylbenzene, divinyl and trivinyltoluene, triallyl maleate, triallyl phosphate, diallyl maleate, and diallyl itaconate.

The monounsaturated monomers may include methacrylates and arylates having straight or branched chain alkyl groups with 1 to 30 carbon atoms preferably 5 to 18 carbon atoms. Preferred monomers include lauryl methacrylate, 2-ethylhexyl methacrylate, isodecylmethacrylate, stearyl methacrylate, hydroxyethyl methacrylate, hydroxypropyl metharylate, diacetone acrylamide, phenoxyethyl methacrylate, tetrahydrofurfuryl methacrylate and methoxyethyl methacrylate. Many of the previously referred to patents contain other suitable monomers that can also be used. Highly crosslinked polymeric systems consisting of particles of submicron size can be prepared from only monomers having at least two polymerizable unsaturated bonds and containing no comonomers having monounsaturated moiety.

The following example is set forth in order to illustrate the concept embodied in accordance with the method of the present invention.

EXAMPLE IV

An oil spill event occurring on a lake, river, or ocean was assimilated on a laboratory scale by means of a large stainless steel container in which was placed four thousand milliliters of tap water. To the tap water was added one hundred thirty-five grams of table salt in order to assimilate a sea water environment. Several oil spill events were assimilated by adding motor oil to the salt water in the container in amounts varying from thirty to one hundred and twenty grams. In each spill event, the hydrophobic macroporous polymer powder of Example I was sprinkled on top of the motor oil and allowed to remain for about thirty seconds. The amount of the polymer powder added during each spill event varied from ten to twenty grams. A wooden tongue depressor was used to agitate the contents of the container both before and after addition of the polymer powder. Polymer powder laden with oil was removed from the container with a four inch by four inch window screen scoop, and the scoop contents were transferred to a glass tray. The results of these assimilated oil spill events are set forth in Table I.

TABLE I

| Oil (gms.) | Powder (gms.) | Agitation | Appearance |
|---|---|---|---|
| 30 | 10 | * | oil not totally adsorbed |
| 40 | 10 | ** | oil not totally adsorbed |
| 50 | 10 | * | oil not totally adsorbed |
| 60 | 10 | ** | oil totally adsorbed |
| 120 | 20 | ** | oil totally adsorbed |
| 120 | 20 | ** | oil totally adsorbed |

*agitated only prior to powder addition.
**agitated both prior to and following powder addition.

It has been found that oil contained in the adsorbent powder is removable from the oil laden powder enabling the powder to be recirculated and redistributed as an adsorbent. Removal has been accomplished surprisingly by mechanical means utilizing an unexpected phenomenon of the adsorbent that the powder material, while being shear sensitive, is not compressive sensitive. Thus, it has been possible to apply compressive forces generated by a pair of stainless steel surfaces to the oil laden adsorbent powder to squeeze out and remove the oil. The compressive forces have not been found to cause a degenerative effect upon the resulting adsorbent powder. It has only been required during laboratory assimilations of compressive forces utilizing two stainless steel disks and a vice, to sift the powder adsorbent prior to its recirculation and redistribution in order to break up any compacted powder masses which may have been formed following squeezing out of the oil. It is envisioned that by employing an open hull design type of vessel, the adsorbent powder can be distributed upon the floating oil surface in the forward section of the vessel and that following adsorption of the oil, scooped from the surface in the aft section of the vessel, squeezed and recirculated and redistributed for oil adsorption. Since the powder adsorbent of this invention is inert for all practical purposes, the recovered oil would also constitute a recyclable commodity.

It will be apparent from the foregoing that many other variations and modifications may be made in the compounds, compositions, and methods described herein without departing substantially from the essential features and concept of the present invention. Accordingly, it should be clearly understood that the forms of the invention described herein are exemplary only and are not intended as limitations of the scope on the present invention.

That which is claimed is:

1. A method of recovering oil floating on a water surface which has been contaminated with oil comprising distributing upon the contaminated surface discrete particles of a hydrophobic macroporous highly cross-linked polymer, the polymer including unit particles of less than about one micron in average diameter, agglomerates of fused unit particles of sizes in the range of about twenty to eighty microns in average diameter, and aggregates of clusters of fused agglomerates of sizes in the range of about two-hundred to about twelve-hundred microns in average diameter, allowing the particles to adsorb and to become laden with oil, recovering the oil laden particles from the water surface, removing the oil from the oil laden particles by applying compressive forces to the oil laden particles and squeezing the oil laden particles in order to remove the oil from the particles, sifting the squeezed substantially oil free particles in order to eliminate excessive agglomeration and aggregation of the particles due to the application of the compressive squeezing forces, recirculating and redistributing the particles substantially free of the oil upon the contaminated surface, and repeating the sequence of steps until substantially all of the oil has been recovered;

wherein the polymer is a polymethacrylate formed of at least one polyunsaturated monomer and of at least one monounsaturated monomer, and wherein said at least one polyunsaturated monomer is selected from the group consisting of ethylene glycol dimethacrylate and tetraethylene glycol dimethacrylate, and wherein said at least one monounsaturated monomer is selected from the group consisting of lauryl methacrylate and 2-ethylhexyl methacrylate.

* * * * *